Nov. 5, 1968   A. IMMARCO ET AL   3,409,781
ELECTRO-OPTICAL ANGLE SENSOR
Filed July 29, 1965   2 Sheets-Sheet 1

INVENTORS
ANTHONY IMMARCO
BY JEROME E. DENNIS

OSTROLENK, FABER, GERB & SOFFEN

ATTORNEYS

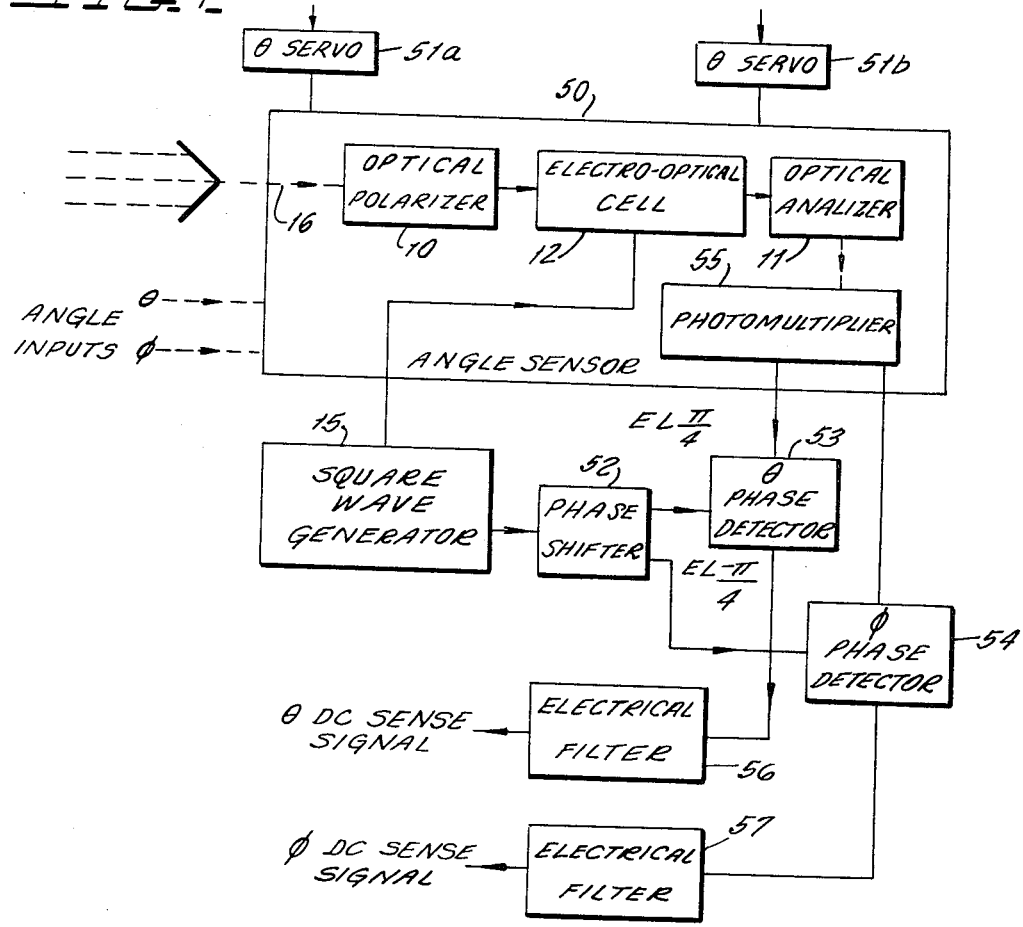

United States Patent Office 3,409,781
Patented Nov. 5, 1968

3,409,781
ELECTRO-OPTICAL ANGLE SENSOR
Anthony Immarco, East Elmhurst, and Jerome E. Dennis, Huntington, N.Y., assignors to Kollsman Instrument Corporation, Elmhurst, N.Y., a corporation of New York
Filed July 29, 1965, Ser. No. 475,736
6 Claims. (Cl. 250—225)

ABSTRACT OF THE DISCLOSURE

An electro-optical angle sensor is disclosed having an optical array that comprises an optical polarizer, an electro-optical cell and an optical analyzer in successive alignment on a common optical axis to respond to a light ray incident upon one end of the array, a source of voltage coupled to the cell for applying an electric field thereto, a photo-sensitive device positioned on the optical axis at the opposite end of the array and an output circuit coupled to the photo-sensitive device to produce an output signal functionally related to the angle of an incident light ray with respect to the optical axis.

---

This invention relates to means for determining the angle of a light source with respect to an optical axis, and more specifically relates to an electro-optical sensor comprising an electro-optical cell positioned between two polarizers wherein the movement of the light source transversely to the optical axis of the system modulates the light intensity passed by the system.

Electro-optical systems are well known to those skilled in the art wherein an electro-optical crystal is placed and aligned between suitably crossed polarizers. It is well known that such systems exhibit variable optical transmission as a function of the the electrical field applied across the electro-optical crystal.

The principle of the present invention is based upon the discovery that once a particular transmission condition has been established, this transmission can be radically changed by a movement of the device which changes the axis of the light beam relative to the optical axis of the device. Thus, by using a suitable photodetector, this angle change is transformed to a change in output potential which is proportional to the change in the angle between the optical or boresight axis of the device and the axis of the optical ray. The sense of this movement is also contained in the output of the photodetector, since the change in light intensity is related to the relative angular position of the two axes about a null.

Thus, the present invention permits the formation of an electro-optical angle sensor having no movable parts. Such sensors are clearly applicable in many fields such as for use in light tracking applications, or in auto-collimating applications, and the like.

Accordingly, a primary object of this invention is to provide a novel electro-optical angle sensor having no movable parts.

Another object of this invention is to provide a novel means for measuring the angle between an optical ray and the boresight axis of a device which comprises an electro-optical crystal placed and aligned between suitably crossed polarizers.

Yet another object of this invention is to provide a novel light tracking system having no moving parts.

Yet a further object of this invention is to provide a novel autocollimator.

These and other objects of this invention will become apparent from the following description when taken in connection with the drawings, in which.

Figure 1:
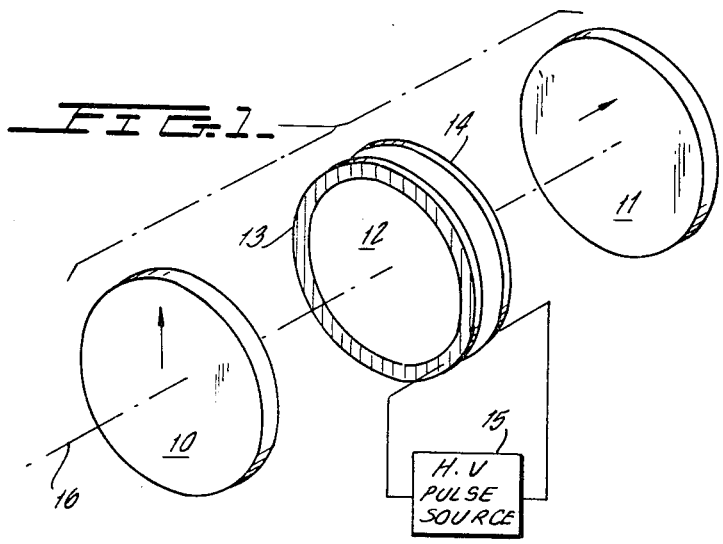
FIGURE 1 shows a perspective diagram of an electro-optical crystal placed between two polarizers.

FIGURE 5 schematically illustrates the manner in which the device of FIGURE 1 is mounted within a suitable housing having a suitable lens system and photo-detector.

FIGURE 6 schematically illustrates the manner in which the device of FIGURE 5 can be used in an auto-collimator.

FIGURE 7 schematically illustrates the manner in which the device of FIGURE 5 can be used in a light tracker application.

Referring first to FIGURE 1, I have illustrated therein two optical polarizers 10 and 11 whose angles of polarization are indicated by the arrows. An electro-optical crystal 12 is then interposed between optical polarizers 10 and 11, and is provided with two ring-shaped electrodes 13 and 14 on its opposing surfaces which are connected to a suitable high voltage pulse source 15.

It will be noted that this system has an optical axis 16 wherein such systems have been commonly used in the past to provide a variable optical transmission which is a function of the electric field applied to electrodes 13 and 14 by the high voltage source 15.

In using such devices in the past, the polarizers 10 and 11 are rotated with respect to one another until some transmission condition is established. Thereafter, this transmission condition is affected by the application of an electric field in the direction of the optical axis 16 through the crystal 12. Such crystals may, for example, be potassium dihydrogen phosphate (KDP) which are commercially available.

In the past, these devices have been used as a polarization retardation structure with the magnitude of polarization retardation being directly proportional to the applied voltage. This is known as the "pockel effect."

Thus, devices of this type have been arranged as shown in FIGURE 5, wherein the crystal 12, polarizers 10 and 11, a suitable lens system 17, and photodetector 18 are mounted within a suitable housing such as housing 19. In the device of FIGURE 5, this system can serve as a static light shutter wherein light will be passed through the system and to the photodetector 18 only when an electric field is applied to the crystal 12. As pointed out above, this application of the device is well known.

The principle of the present invention involves the discovery of a property of a device such as that shown in FIGURES 1 and 5, wherein once a particular transmission condition has been established by the application of an electric field and the proper angular orientation of polarizers 10 and 11, this transmission has been found to vary considerably as a function of the angle between the incident light ray and the optical axis of the device. The reason for this operation is not understood at the present time. However, after discovering this property of the device, it has been recognized that this property lends the device to extremely useful application as an angle measuring device, as required for autocollimators or star trackers, or the like.

Figure 2:
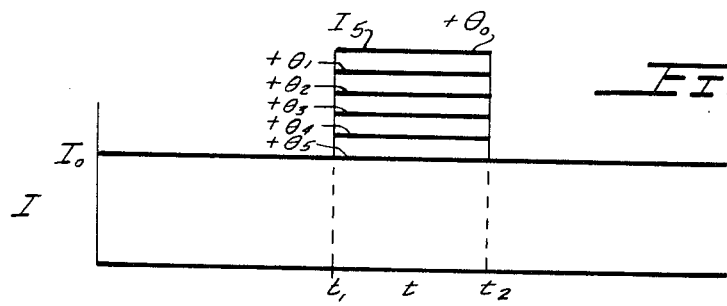
FIGURE 2 illustrates the light intensity passed through the device of FIGURE 1 after a predetermined transmission condition has been established and illustrates the manner in which the light intensity passed by the device varies as a function of the angle of the light rays to the optical axis of the device when a high voltage pulse is applied to the electrodes.
Figure 3:
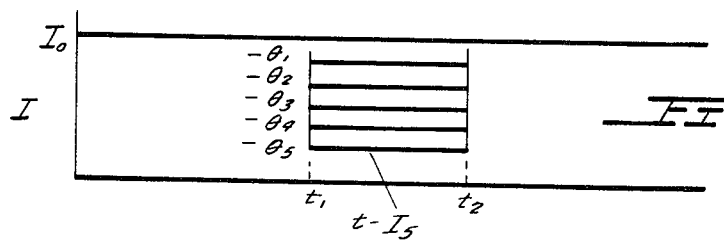
FIGURE 3 is similar to FIGURE 2, and illustartes the light transmitting condition during pulse conditions for the angle between the optical axis of the device and the incident light ray being a negative angle.
Figure 4:
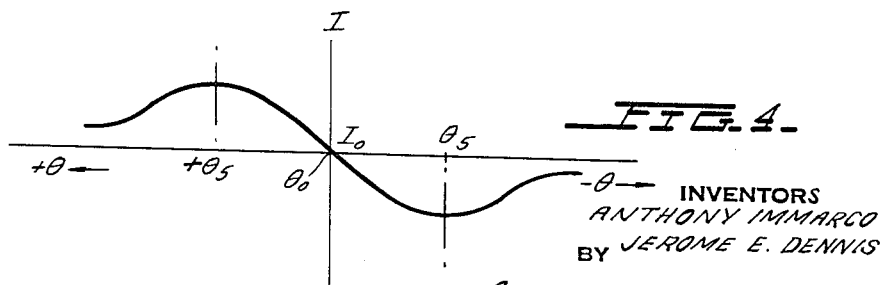
FIGURE 4 illustrates the light intensity passed by the device of FIGURE 1 as a function of the angle of the incident light to the optical axis of the device.

The manner in which this phenomenon operates is illustrated in FIGURES 2, 3 and 4. More specifically, in FIGURES 2 and 3, we have illustrated the light intensity passed by the device as a function of time. The complete device is first adjusted (by rotation of plates 10 and 11) until some median transmission level $I_0$ is established. In the past, it has been known that the application of an electric field to electro-optical crystal 12 would radically affect the polarization of the light passed by polarizer 10 thereby to change the indensity of light through the system. Thus, upon the application of a voltage pulse lasting from times $t_1$ to $t_2$ in FIGURE 2, the light intensity transmitted through the device would increase to the level $I_5$.

In accordance with the invention, the system is adjusted so that when the optical axis 16 is adjusted parallel to the light ray incident upon the device, there will be the normal increase in output light intensity to the level $I_5$. In accordance with the invention, and as the angle between the incident light ray and the optical axis of the device is changed, the light intensity passed by the device varies in the manner shown in FIGURES 2, 3 and 4.

Thus, as the angle $\theta$ increases positively from $\theta_1$ to $\theta_5$, the transmitted light intensity during the pulse period decreased from the level $I_5$ to the level $I_0$. Moreover, as the angle continues to change in a negative direction, the light intensity decreases from its initial value $I_0$ to the negative value $-I_5$ as the angle changed from $-\theta_1$ through $-\theta_5$. The change of light intensity as a function of $\theta$ which was observed is shown directly in FIGURE 4. It is to be noted the the angle $\theta$ is plotted as the angle with respect to a plane which is parallel to the optical axis 16 and is measured along the direction of the polarization vector shown on polarizer 10. Other angular references could have been selected as well.

The manner in which this unusual and unexplained phenomenon can be usefully applied is first illustrated in FIGURE 6 for the case of an autocollimator. Thus, in FIGURE 6, it could, for example, be desirable to adjust the position of a mirror 30 in some predetermined spatial relation with respect to a light source 31. To this end, the mirror 30 reflects the light rays of light source 31 through a suitable optical system which could include a collimating lens 32 toward the device 33 which is identical to that shown in FIGURE 5.

The output terminals 34 and 35 of the light sensor 18, which could be a photomultiplier, will then be functionally related to the angle of mirror 30 with respect to light source 31, whereupon the mirror 30 is adjusted until this output voltage is that output voltage which is obtained when the incident light rays are parallel to the optical axis of the device (until light intensity $I_5$ is obtained).

Alternatively, the device of FIGURES 1 and 5 have application to light tracking devices, or general angle sensor and measuring circuitry.

This application is schematically illustrated in FIGURE 7 wherein the block 50 represents the device of FIGURE 5 which is mounted in a suitable gimbal mount which is connected to two servos 51a and 51b which will drive the optical axis 16 of the device in a suitable manner.

The high voltage pulse source 15 is further shown in FIGURE 7 as a square wave generator which, for example, generates a pulse voltage having a 7,000 volt magnitude. The output of the square wave generator 15 is then connected to a suitable phase shifter 52 which is, in turn, connected to two first and second phase detectors 53 and 54, respectively, wherein the output phase detectors 53 and 54 are phase shifted by +45°, respectively. The output of each of phase detectors 53 and 54 are then connected to the photomultiplier 55 which comprises the light sensing device 18 of FIGURE 5 with the output of phase detector 53 connected to the electrical filter 56 and the output of phase detector 54 connected to the electrical filter 57.

The electrical filter 56 will then develop a D-C output signal which could, for example, be sense-responsive to the deviation of a light source observed by device 50 in altitude, while the electrical filter 57 develops a D-C signal which is variable in sense and magnitude to variations in elevation of the light source observed by the device 50. These output signals are then electrically connected to the $\theta$ servo 51a and the $\phi$ servo 51b which adjust the device 50 in altitude and elevation, respectively.

The operation of this system is then substantially identical to that operation well known for the case of star tracker devices having a scanning raster, as shown in U.S. Patent No. 2,905,828; in the name of O'Malley et al. assigned to the assignee of the present invention. Thus, if there is a misalignment between the optical axis 16 of the device and the light source being tracked, the output of the photomultiplier 55 during the pulse operation will contain the information as to this misalignment in both magnitude and sense.

The output signal of the photomultiplier is then phase demodulated with the respective components of altitude misalignment and elevation misalignment being separated in the phase detectors 53 and 54 and applied through their respective filters 56 and 57 to the adjustment servos 51a and 51b to move the optical axis 16 in a direction to tend to make it parallel to the direction of the incident rays from the light source being tracked.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. The method of sensing the angle between light rays from a light source and an optical axis; said method comprising the alignment of an optical polarizer, an optical analyzer and an electro-optical cell interposed between said polarizer and analyzer on a common optical axis, passing said light rays from said light source through said polarizer, cell and analyzer and toward a light-sensing means, adjusting the angular relation between said analyzer and polarizer until a transmission condition is established, applying an electric field across said cell to retard the polarization of said light rays, and measuring the light intensity falling on said light-sensing means as a function of the angle of said light rays to said optical axis.

2. An electro-optical angle sensor comprising a common support housing receiving an optical polarizer, an electro-optical cell and an optical analyzer; said optical polarizer, electro-optical cell and optical analyzer having a common optical axis; said electro-optical cell interposed between said optical polarizer and said optical analyzer and having opposing electrodes for applying an electric field to said electro-optical cell; a light source and a photosensitive device; said light source positioned on one side of said electro-optical angle sensor; said photosensitive device positioned on the other side of said angle sensor and centered on said optical axis; voltage source means connected across said opposing electrodes and output circuit means connected to said photosensitive means; the output signal of said photosensitive means being functionally related to the angle of the rays of said light source to said optical axis.

3. The sensor as set forth in claim 2 wherein said electro-optical cell comprises a crystal of potassium dihydrogen phosphate.

4. The sensor as set forth in claim 2 wherein said electro-optical cell comprises a crystal of an electro-optical shutter.

5. A method of detecting the angle between an incident light ray and an optical axis comprising the alignment of an optical polarizer, an optical analyzer and an electro-optical cell interposed between said polarizer and analyzer on a common optical axis that presents an optical path accommodating through transmission of the light ray, adjusting the angular relation between the analyzer and the polarizer until a transmission condition is established, applying an electric field across said cell to retard the polarization of said light ray, and producing a signal proportional to the intensity of the light ray transmitted through said optical path.

6. An electro-optical angle sensor having an optical array comprising optical polarizer means: electro-optical cell means and optical analyzer means in successive alignment on a common optical axis to respond to a light ray incident upon one end of said array; said cell means having electrode means coupled thereto for applying an electric field thereto, photosensitive means positioned on said optical axis on the opposite end of said array, output circuit means coupled to said photosensitive means to produce an output signal functionally related to the angle between said optical axis and the light ray incident upon said array.

References Cited
UNITED STATES PATENTS

| 3,069,973 | 12/1962 | Ames | 250—225 |
| 3,161,715 | 12/1964 | Davidson | 88—14 |
| 3,324,393 | 6/1967 | Casey et al. | 250—225 |

JAMES W. LAWRENCE, *Primary Examiner.*

W. J. SCHWARTZ, *Assistant Examiner.*